United States Patent

Cunningham

[15] 3,686,360

[45] Aug. 22, 1972

[54] CONDENSED LINEAR POLYESTERS AND COATINGS CONTAINING SAME

[72] Inventor: Arthur L. Cunningham, Park Forest, Ill.

[73] Assignee: The Sherwin-Williams Company, Cleveland, Ohio

[22] Filed: Oct. 8, 1970

[21] Appl. No.: 79,304

[52] U.S. Cl..........260/850, 117/161 K, 117/161 LN, 260/32.8 R, 260/33.4 R, 260/33.6 R, 260/75 N, 260/76, 260/77
[51] Int. Cl. .............................................C08g 37/34
[58] Field of Search.......................................260/850

[56] References Cited

UNITED STATES PATENTS

| | | |
|---|---|---|
| 3,549,577 | 12/1970 | Stromberg..................260/850 |
| 3,502,557 | 3/1970 | Yurcheshen et al.......260/850 |
| 3,108,089 | 10/1903 | Ferstandig.................260/850 |
| 2,462,658 | 2/1949 | Moffett.......................260/850 |
| 2,915,486 | 12/1959 | Shelley......................260/850 |

FOREIGN PATENTS OR APPLICATIONS

| | | |
|---|---|---|
| 559,963 | 7/1958 | Canada......................260/850 |
| 815,179 | 6/1959 | Great Britain.............260/850 |

*Primary Examiner*—John C. Bleutge
*Attorney*—McNenny, Farrington, Pearne & Gordon

[57] ABSTRACT

Noncrystalline condensation products of normally crystalline linear polyesters having hydroxyl functionality with alkylated alkylol amines or amides are provided, as well as coating compositions containing such condensation products.

9 Claims, No Drawings

CONDENSED LINEAR POLYESTERS AND COATINGS CONTAINING SAME

RELATED APPLICATION

This application is a continuation-in-part of my copending application Ser. No. 691,226 filed December 18, 1967, now abandoned.

This invention relates to a novel modified polyester composition and the order of reaction for preparing the same and to coating compositions containing the same. More particularly, this invention relates to a novel noncrystalline polyester composition comprising the reaction product of a low molecular weight symmetrical dihydric alcohol and lesser amounts of trifunctional reactants or monobasic acids with mainly aromatic dibasic acid, which is then further modified with an alkylol amine or alkylol amide, e.g., hexakis (methoxymethyl) melamine to yield a noncrystalline modified polyester. The proportions of carboxylic acids of various functionality and alcohols of various functionality are limited to specific ratios as set forth below.

The unmodified hydroxyl containing polyesters, which have desirable properties (e.g., heat stability) because of their crystalline nature are, unfortunately, characterized by insolubility in normal hydrocarbon or oxygenated solvents. Such crystallinity is imparted by the linear chain segments and results in precipitation from solution of polyester crystallites. Precipitation occurs either immediately after cooling a solution of the polyester to a temperature below the crystalline melting point (Tm), or it may be delayed for hours or days because of slow crystallite formation. Coating compositions so composed of these crystalline polyesters and normal solvents or diluents have limited shelf life and inevitably become degraded.

It has now been found that this problem may be largely obviated by condensing these hydroxyl containing polyesters with an alkylated alkylol amine, e.g., hexakis (methoxymethyl) melamine inhibits crystallite formation to such an extent that the so modified polyester compositions remain soluble for practical periods of time, e.g., greater than four months. Quite surprisingly, however, although the crystallinity of the polyester is altered so that it appears to behave as a noncrystalline material to achieve solution stability, the desirable property of crystalline linear polyesters in respect of thermal stability is preserved. Thus, for example, a baking coating composition of useful shelf life and excellent baking characteristics for coil metal coating may be formulated of these alkylated alkylol amine modified, normally crystalline, linear, hydroxyl-containing polyesters.

A particularly suitable polyester for modification in accordance herewith is poly (neopentyl isophthalate), a highly crystalline polyester otherwise unusable because of solution instability below the crystalline melting point.

The term "polyester," as used herein, refers to polymers made by reacting monomeric carboxylic acids wherein the major amount of carboxylic acid is difunctional, and alcohols wherein the major amount of alcohol is difunctional. The monomer or mer units recur two or more times in the molecule. Such polyesters are referred to in the prior art as "alkyd resins" or "saturated polyesters." These polyesters, which are preformed in the process for preparing the novel polyesters of the present invention are modified by at least partially reacting with an alkylol amine, such as hexakis (methoxymethyl) melamine or other equivalent melamine formaldehyde derivatives as set forth hereinbelow.

The present invention provides a modified polyester composition which converts to a tough, insoluble film upon exposure to a thermal cure. The present invention provides a resin having a thermal cure adaptable to the practices of present industrial metal coil coating operations, e.g., aluminum metal coil coating operations. The present invention also provides a vehicle which provides thermally cured, pigmented films having sufficient flexibility for subsequent postforming of coated coil stock while still exhibiting the excellent color stability to thermal exposure and resistance to weathering which are characteristic of polyester resins prepared from a select group of low molecular weight symmetrical diols and dibasic carboxylic acids which are mainly aromatic with lesser amounts of specific triols or monocarboxylic acids.

Briefly stated, then, the present invention is in a modified linear polyester, and particularly polyesters of at least one phenylene dicarboxylic acid, one aliphatic dicarboxylic acid, one symmetrical diol, one triol, and optionally a monocarboxylic acid, preferably aromatic which polyester has an average hydroxyl functionality of from 1.9 to 2.6 free hydroxyl groups per molecule and a molecular weight in the range of from about 900 to about 4,000 and in which the ratio of the equivalents of hydroxyl to the equivalents of carboxyl is in the range of from 1.08 to 1.24 prior to modification, said polyester being modified by reaction thereof with an alkylol amino compound as more particularly described below. The temperature of the reaction is in the range of from 150° to 450° F. for a period of from 20 minutes to 5 hours. This, of course, is a time-temperature relationship of the type well known to chemists, the higher the temperature, the shorter the period of reaction. The amount of alkylol amine compound is from 50 to 150 parts by weight per hydroxyl equivalent of unmodified polyester. This invention also contemplates coating compositions formed from this vehicle material.

Polyester resins appearing in the prior art which are formulated to have sufficient flexibility for the postforming requirements found in the coil coating application derive this flexibility as a result of the use of polybasic acids possessing long methylene chains, particularly dibasic acids derived from vegetable fatty acids. Such compositions are described in U. S. Pat. No. 3,158,584. An alternative composition is derived from the use of monobasic acids containing in excess of six methylene linkages which are included in the formulation to enhance flexibility. These fatty acid modified polyesters have been known in the prior art for many years. These compositions, when cold blended with optimum amounts of a melamine-formaldehyde resin, particularly hexakis (methoxymethyl) melamine, provide sufficient flexibility to meet the coil coating requirements. These are obtained, however, at the cost of color stability on thermal exposure and weatherability when compared to polyester resins derived from low molecular weight reactants which have been found to excel in these properties. Superior performance with regard to color stability on thermal exposure and resistance to ultraviolet exposure are provided with the introduction of linear chains of symmetrical diol and aromatic dicarboxylate such as poly(2,2-dimethyl-1,3 propylene isophthalate) into the polyester composition. When these are introduced into the polyester composition with a minimum amount of branching provided for by the inclusion of a triol or higher functional polyol, or alternatively tribasic acid, and a minimum of internal flexibilization provided by a polymethylene dicarboxylic acid, this superior performance is accompanied by a high degree of hardness and flexibility.

As has been pointed out, the presence of linear chains in an unmodified polyester leads to the phenomenon of crystalline precipitation. In the order of crystallizability, the compositions found to exhibit this property are given in the table below describing the properties of hydroxyl end blocked, linear segments dissolved at 60 percent resin solids in a solvent consisting of 70 parts 100 flash aromatic naphtha, 15 parts cyclohexanol, and 15 parts isophorone. This solvent was determined near optimum for the polyester by application of the principles of solvent parameters. The polyesters described were reacted to a molecular weight of approximately 3,000.

| Chain Composition | Time Elapsed Before Crystalline PPT | $T_g$ °C. | $T_m$ °C. |
|---|---|---|---|
| 1. poly(ethylene terephthalate) | Upon cooling | 46–65 | 258 |
| 2. poly(ethylene isophthalate) | Upon cooling | 48 | 110 |
| 3. poly(2,2dimethyl-1,3-propylene terephthalate) | Upon cooling | 60 | 134 |
| 4. poly(1,4-butylene isophthalate) | Upon cooling | 34 | 141 |
| 5. poly(1,6-hexylene isophthalate) | Upon cooling | −2 | 81 |
| 6. poly(ethylene o-phthalate) | Several hours | n.r. | n.r. |
| 7. poly(2,2-dimethyl-1,3-propylene o-phthalate) | 20 hours | 22 | 97 |

NOTE: $T_m$ signifies crystalline melt temperature and $T_g$ signifies glass transition temperature.

It can be seen that the polyesters described are relatively insoluble in one of the best organic solvents found for their solution. The precipitates formed were determined to be highly oriented by the fact that they gave little or no evidence of a second order transition, but displayed a large melt endotherm when analyzed by thermal analysis.

There are several methods of solubilizing the polyester compositions described:
1. Tri or higher functional reactants may be used to introduce branching which shortens the chain length of the crystallizable segments to a degree that inhibits the formation of crystallites. Unfortunately, this also contributes to brittleness in cured films.
2. Large amounts of methylene content can be introduced, usually by the inclusion of polymethylene dicar-boxyl acids along the chain segments. This, unfortunately, adversely effects hardness, thermal resistance and UV resistance.

The prior art oil-free polyesters avoided the crystallization problem by employing a combination of these modifications to the linear chain segments. It is a purpose of the instant invention to introduce a third means of inhibition of crystallite formation; namely, condensation with an alkylated alkylol amine, e.g., hexakis (methoxymethyl) melamine so that the amount of crystallizable chain segments can be increased before the rate of crystallite formation reduces the solubility to impractical levels.

The phenylene dicarboxylic acids useful herein are the ortho-, meta- and para-phthalic acids. The amount of phenylene dicarboxylic acid ranges from 35 to 60 percent by weight of the resin forming ingredients charged or the total of the reactants used to form the polyester.

The flexibilizing dibasic acids are $C_4$–$C_{13}$ aliphatic dicarboxylic acids and include each of the members of the homologous series of polymethylene-alpha omega dicarboxylic acids from glutaric to brassylic. Also applicable are such acids as malonic, maleic or its anhydride, fumaric, tetrahydrophthalic and its anhydride, hexahydrophthalic and its anhydride, endomethylene tetrahydrophthalic and its anhydride, hexachloroendomethylene tetrahydrophthalic and its anhydride, diglycolic or thiodiglycolic acid, citric acid or itaconic acid. Obviously, the methyl esters of the dibasic acids listed could be utilized in the practice of this invention by means of reacting by transesterification versus the normal esterification route. Isophthalic acid and adipic acid blends are the preferred dibasic acids.

Diols which are included in the concepts herein are symmetrical in structure with the ability to align in crystallites when incorporated into linear segments with aromatic dicarboxyl acids. Such diols are the homologous series including ethylene, trimethylene, tetramethylene, pentamethylene to hexylene alpha-omega diols or symmetrical alkyl substituted homologues thereof such as 2,2-dimethyl-1,3-propane diol, 1,3-propane diol, 1,4-butane diol, 1,5-pentane diol, 1,6-hexane diol, etc.

Specific examples of monobasic carboxylic acids containing from two to 14 carbon atoms, both linear and branched, aliphatic or aromatic, and derived from synthetic or natural sources applicable to this invention include benzoic acid, paratertiary butyl benzoic acid, acetic acid, propionic acid, 2-methyl propionic acid, 2,2-dimethyl propionic acid or monoesters or phthalic anhydride, tetrahydrophthalic anhydride, hexahydrophthalic anhydride, or endomethylene tetrahydrophthalic anhydride as described in my copending application Ser. No. 604,591, now abandoned. Such monoesters applicable to the polyester of the present invention include ethyl, propyl, isopropyl, n-butyl, iso-butyl, t-butyl, cyclohexyl, tetrahydrofurfuryl, benzyl, methoxyethy. ethoxy ethyl, butoxyethyl, phenoxyethyl, methoxy-2-methylethyl, ethoxy-2-methylethyl, butoxy-2-methylethyl and phenoxy-2-methyl ethyl. A preferred monobasic acid component to the polyester of the present invention is monoisobutyl phthalate.

Specific examples of triols or higher functional polyols, tricarboxylic acids or mixed carboxyl-hydroxyl functional com-pounds referred to hereinbelow as branching monomer which are applicable to the preparation of the polyesters of the present invention include trimethylolpropane, trimethylolethane, pentaerythritol, glycerin, dimethylol propionic acid, trimellitic anhydride, pyromellitic anhydride or 1,3,5-tricarboxypentane.

The technique utilized in preparing the initial polyester resin composition is as follows: In the process, monoanhydrides which are intramolecular anhydrides of monocarboxylic acids and monohydric alcohols are utilized. The monoanhydrides which may be used include: phthalic anhydride; halogen substituted phthalic anhydride; maleic anhydride; tetrahydrophthalic anhydride; hexahydrophthalic anhydride; endomethylene tetrahydrophthalic anhydride and hexachloroendomethylene tetrahydrophthalic anhydride. The monohydric alcohols which may be used include: ethanol; isopropanol; n-propanol; n-butanol; isobutanol; t-butanol; mixed butanols; 2-ethyl hexanol; n-hexanol; octyl alcohol; isoxtyl alcohol; 2-ethylhexyl alcohol; benzyl alcohol; alkyl substituted benzyl alcohol; halogen substituted benzyl alcohol; cyclohexanol; tetrahydrofurfuryl alcohol; hydrogenated rosin; crotyl alcohol; allyl alcohol and ethoxylated or propoxylated monohydric alcohols.

In the preferred method of preparation of the resin compositions of the present invention, the diol and dibasic acid are charged into a reaction vessel and reacted at from 325° to 450° F. for 3 hours to provide a partially practed linear polymeric polyester. A tight system provided with a fractionating column to insure the separation of the water formed during the reaction from the unreacted diol is preferred. The monohydric alcohol-monoanhydride half ester is prepared in a separate reaction vessel before or simultaneously with the preparation of the partially reacted linear polyester. This is accomplished by first charging the monoanhydride and heating to fusion. The monohydric alcohol is charged gradually so as to eliminate reflux. The reaction is complete upon addition of all the monohydric alcohol, and the monohydric alcohol-monoanhydride half ester is held at a slightly elevated temperature to be charged into the partially reacted polyester along with the branching polyol. The reaction vessel is used for preparing the monohydric alcohol-monoanhydride half ester should preferably be provided with total reflux. This is not absolutely essential since even the more volatile alcohols can be added with little or no reflux by adjusting the addition rate. The monohydric alcohols-monoanhydride half ester based on lower alcohols are solids at room temperature. However, thy can be held for short times at room temperature as supercooled liquids if this is desired.

The branching polyol and monohydric alcohol-monoanhydride half ester are charged simultaneously with a small quantity of entraining solvent (e.g., xylene or toluene) and the resin reaction is completed in the normal fashion at 400° to 450° F. until the desired final acid value is reached. The finished resin is then dropped into a thinning tank provided with solvent to obtain the final desired resin solution.

There is a point in the range of normally crystalline, linear, hydroxyl-containing polyesters modifiable by condensation with an alkylated alkylol amines where even such condensation will not sufficiently solubilize the material to render it useful. Therefore, a range of R and K values is established for the polyester which includes those polyesters operatively and favorably influenced by modification with an alkylated alkylol amine, and excludes those not found to be so beneficiated. By "normally crystalline" as used herein is meant those polyesters which have a crystalline melt temperature (Tm) above room temperature. The useful polyesters prior to modification have a molecular weight in the range of from about 900 to about 4,000.

It is convenient to express the stoichimetric limits of the various reactants applicable to the present invention in terms of two ratios which are described in "Alkyd Resin Technology" by T. C. Patton, published by Interstate Publishers, 1962. These ratios are "K," the alkyd constant, defined as the ratio of the total moles charged divided by the total equivalents of carboxylic acid charged and "R," the functional ratio, defined as the total equivalents of hydroxyl charged divided by the total equivalents of carboxyl charged. The limits of R for the polyester of the present invention are 1.08–1.24 inclusive. The limits of K for the polyester of the present invention are 1.025–1.090. In all cases the values of K for specific values of R shall satisfy the constraints expressed by the statements $K \geq 1.005 + 0.046R$ and $K \leq 1.060 + 0.046R$. In addition, the ratio expressed by dividing the equivalents of all difunctional reactants by the total equivalents of tri or higher functional reactants used in the polyester of the present invention is equal to or greater than 5.

The polyesters of the present invention which are defined by the stoichiometric parameters set forth above, and comprised of monomer also set forth above, are essentially linear, hydroxyl containing end blocked polyesters having a minor degree of branching, or linear polyesters partially end-blocked by monofunctional reactant. The hydroxyl content falls within the limits of 1 to 3.5 percent and the carboxyl content expressed as conventional acid value is 15 or less. The polyesters falling within these specifications, and utilizing the raw materials set forth contain sufficient crystallizable chain segments to render them insoluble or of limited solubility in hydrocarbon or oxygenated solvents. Furthermore, they define the compositions which may be effectively solubilized by modification with alkylated alkylol amines. The polyesters of the present invention are modified further with 60 to 150 parts by weight of hexakis (methoxymethyl) melamine or blends of hexakis (methoxymethyl) melamine with tetrakis (methoxymethyl) benzoguanamine per hydroxyl equivalent of the polyester. These alkylated alkylol amines are prepared using procedures set forth in the literature, notably, U.S. Pat. Nos. 2,998,410 and 2,998,411. This provides solubility of the modified polyester of the present invention in practical solvents widely used in coatings as well as adequate thermosetting properties.

The polyesters useful in the present invention are condensed using established procedures for the preparation of polyester resins. It has been found that best results are obtained when all of the difunctional reactants are charged initially and reacted to an intermediate acid value; whereupon, the branching monomer chain stopping monofunctional acid is added, and the acid value is brought to the low level desired in the final product. Temperature conditions are then moderated and, in most cases, inert solvent is added to carry out the alkylated alkylol amine modification.

The process for making the alkylated alkylol amines which are applicable to the present invention is not a part of this invention. Those which have been found most suitable are highly alkylated hexamethylol melamine and tetramethylol benzoguanamine. The details for preparing these are covered in the aforementioned U.S. Pat. Nos. 2,998,410 and 2,998,411. Essentially pure hexakis (methoxymethyl) melamine is commercially available. In the practice of this invention these are found to perform in a slightly different manner due to the lower degree of alkylation and higher degree of condensation. The latter results in a more rapid viscosity buildup during the modification of the polyester with the alkylated alkylol amine.

In addition to alkylation of the alkylol amine with methanol, higher alcohols may be utilized such as ethanol, isopropanol, butanol isomers and so forth. Alkylation with higher alcohols will actually enhance the ability of the alkylated alkylol amine to solubilize the linear polyester; however, it will also reduce the cure rate of the polyester system when the resin is finally utilized as a coating. For the best practice of this invention, the alcohol or mixtures of alcohols should be of $C_4$ carbon length or less, although small amounts of higher alcohols can be tolerated without adversely affecting the final cure rate.

Polyamines other than the preferred melamine and organic compounds or condensates with pendant unsubstituted amide groups may be applied in like manner in this invention. Examples of other polyamines which are applicable to the practice of this invention include: aryl or alkyl substituted melamine, urea, ethylene diamine, diethylene triamine, diethylene tetramine and amine functional condensates with polybasic acids such as those listed hereinbefore. Also, the unsubstituted amides formed by the condensation of ammonia with polybasic acids such as those listed hereinbefore can be alkylolated and alkylated in like manner. The average effective functionality of the alkylated alkylol amines should be in excess of 2 and preferably from 2.5–3.5.

Although alkylolation can be carried out with higher aldehydes, formaldehyde is preferred. The success with which alkylolation can be carried out is known to fall off as the higher homologs such as acetaldehyde, etc., are used. However, higher aldehydes up to $C_4$ may be used for the alkylolation.

Although essentially completely alkylated, monomeric alkylol amines are utilized in the preferred concept of this invention, the use of alkylol amine resins having relatively lower degrees of alkylation and higher degrees of condensation may be utilized providing the polyester is of sufficiently low hydroxyl functionality to avoid gelation. In general, polyesters with average functionalities less than 2.00 may be modified with normal butylated melamine resins without obtaining gels. The more the free alkylol groups and the higher the relative condensation, the lower the average functionality of the polyester required to avoid gelation or instability of the resultant alkylated alkylol amine modified polyester.

In order that the concept of the present invention may be more completely understood, the following examples are set forth. These examples are set forth primarily for the purpose of illustration and any specific enumeration of detail contained therein should not be interpreted as a limitation except as is indicated in the claims. The unmodified polyesters all have physical and chemical properties within the limits stated above. The quantities are stated by weight unless otherwise indicated.

EXAMPLE 1

Into a flask provided with an agitator, a packed column, a total condenser affixed to the top of the packed column to condense the vapors passing through the packed column and empty them into a receiver, a thermometer and an inert gas inlet were charged: 594 parts adipic acid, 1,040 parts neopentyl glycol, and 1,011 parts isophthalic acid. These ingredients were condensed at temperatures up to 470° C. (taking care that no glycol passes through the packed column) to an acid value of 60 to 80 (a clear pill); whereupon 204 parts of trimethylolpropane were added. The condensation was then continued until the acid value reached a value of 10. This polyester had a R value between 1.00 and 1.24 and a K value within the range indicated and a molecular weight of about 1,200. The reaction mixture was then cooled to about 400° F. and 500 parts of 100° F. flash aromatic hydrocarbon solvent having a reflux temperature of approximately 310° F. was added. 350 parts of hexakis (methoxymethyl) melamine having a dimer content of not more than 5 percent and a free hydroxyl content of not more than 5 percent of those (theoretically available for alkylation) was added, and the reaction mixture was held at reflux for an hour. The reduced viscosity taken at sixty per cent resin solids and 78° F. in the aromatic solvent used was observed to increase from 2.75 poise to 10.7 poise during this reaction. The resin was reduced to 60 percent solids in a solvent blend having a final composition of 70 arts of 100° F. flash aromatic solvent, 15 parts cyclohexanol, and 15 parts isophorone. The resin had the final characteristics: viscosity 9 poise; acid value (solids) 9; and color, Gardner 1.

EXAMPLES 2 & 3

The following ingredients were charged into flask setups as described in Example 1, and reacted in the order given in Example 1:

| | 2 | 3 |
|---|---|---|
| Adipic Acid | 594 | 594 |
| Neopentyl Glycol | 1180 | 1192 |
| Isophthalic Acid | 1011 | 1011 |
| Trimethylolpropane | 29 | — |
| Pentaerythritol | — | 14 |
| 100 Flash Aromatic | 550 | 550 |
| Hexakis (methoxymethyl) melamine | 380 | 380 |
| Prior to modification with the melamine derivative, the molecular weights of the polyesters were in the range of 900 to 4000. | | |

The reduced viscosity run as described in Example 1 drifted from 1.8 poise to 2.3 poise for Example 2 and 1.5 poise to 2.0 poise for Example 3 during the hour hold at reflux with hexakis (methoxymethyl) melamine. The final resins cut to 60 per cent solids in a solvent blend consisting of 75 parts 100° F. flash aromatic solvent, 15 parts cyclohexanol, and 15 parts isophorone had the following characteristics:

| | 2 | 3 |
|---|---|---|
| Viscosity (poise at 78°F.) | 2.3 | 2.0 |
| Acid Value | 9 | 9 |

EXAMPLES 4, 5 & 6

In reaction setups as described in Example 1 were charged:

|  | 4 | 5 | 6 |
|---|---|---|---|
| Adipic Acid | 594 | 594 | 594 |
| Isophthalic Acid | 1000 | 1000 | 1000 |
| Neopentyl Glycol | 322 | 1285 | 1285 |
| 1,3-Propane Diol | 679 | — | — |
| Monoisobutyl phthalate | 280 | 280 | — |
| Benzoic Acid | — | — | 142 |

The monoisbutyl phthalate was prepared in an auxiliary reactor by charging 194 parts of phthalic anhydride, fusing at 300° F. and adding 86 parts of isobutanol. This was prepared as required for the polyester. As in Example 1, only the difunctional reactant was charged initially. The monoisobutyl phthalate or benzoic acid are charged after the other reactants have condensed sufficiently to give a 40–60 acid value. The reaction is then continued until the acid value dropped to 10. The resultant polyesters had R and K values within the ranges stated above, and molecular weights between 900 and 4,000. The melamine modification is carried out as in Example 1 by adding 360 parts of 100° F. flash aromatic hydrocarbon solvent and 334 parts of hexakis (methoxymethyl) melamine. The resins were diluted to 60 percent solids concentration in a solvent blend with the final composition of: 70 percent 100° F. flash aromatic solvent, 15 percent cyclohexanol and 15 per isophorone. The resins had the following characteristics:

|  | 4 | 5 | 6 |
|---|---|---|---|
| Viscosity (poise) | 2.5 | 0.8 | 2.4 |
| Color (Gardner) | 2–3 | 1–2 | 1 |

The polyester compositions described in Examples 1–6 were investigated for solubility both before and after melamine modification. All polyesters and R and K values within the limits set forth above. The polyester resins without polyester modification were cut in a solvent combination previously found most suitable for saturated polyesters of this type. The time required for the appearance of a crystallite precipitate in samples stored at 40° F. is as follows:

| Resin Example | Not Hexakis (methoxymethyl) Modified | Hexakis (methoxymethyl) Modified |
|---|---|---|
| 1 | 3 mos. | >4 mos. |
| 2 | 5 days | >4 mos. |
| 3 | 5 days | >4 mos. |
| 4 | 0.5 day | 3 mos. |
| 5 | 1 day | 3 mos. |
| 6 | 1 day | 3 mos. |

EXAMPLE 7

The polyester prepared as given in Example 6 was modified as in Example 1 by adding 400 parts of hexakis (ethoxymethyl) melamine. A viscosity of 2.2 poise and a color of 1 is obtained.

EXAMPLES 8, 9 & 10

The following ingredients are charged into a flash setup as described in Example 1 and condensed to a low acid value.

|  | 8 | 9 | 10 |
|---|---|---|---|
| Adipic Acid | 594 | 594 | 594 |
| Isophthalic Acid | 1000 | 1000 | 1000 |
| Neopentyl Glycol | 1285 | 1285 | 1285 |
| Benzoic Acid | 160 | 200 | 220 |

These polyesters have molecular weights between 900 and 4,000 and are cut to 60 percent solids content with xylene. A 60 percent solids isobutylated melamine resin is prepared by reacting 188 parts of melamine with 785 parts of isobutyl formaldehyde (containing 30 percent formaldehyde) in 244 parts of isobutanol, the reaction mixture being buffered at the pH of 6–8. 280 parts of the resultant isobutylated melamine resin is added to the polyester resins, and the reaction mixture is held at refluxing xylene temperature for one hour during which time approximately 70 parts of isobutanol is removed from the reaction mixture. The reaction mixture is then allowed to cool, and 70 parts of isobutanol is added to bring the resin solids concentration to 70 percent. The resultant resins are water white having the following characteristics:

|  | 8 | 9 | 10 |
|---|---|---|---|
| Viscosity Poise before Modification | 0.85 | 0.65 | 0.65 |
| Viscosity Poise after Modification | 23 | 2.6 | 2.00 |

These resins exhibit adequate stability and cure to give highly flexible coatings.

It can be seen from this data that melamine modification resulted in resins having a reasonable solution stability for industrial use.

The resins described in Examples 1–6 were prepared into gloss enamels using 20 volume per cent rutile titanium dioxide. These enamels were cast into films on 24 mil aluminum and evaluated as coil coating vehicles. They were cured for 70 seconds in a circulating air oven. The date obtained is presented in the following table along with that obtained for a commercial polyester cured with 15 percent (based on resin solids) of hexakis (methoxymethyl) melamine.

| Resin Example | K | R | T-bend Passed | Color Change -100% Overbake (McAdams units) | Percent Gloss Retained 400 Hours Weather-Ometer Exposure | Tukon Hardness |
|---|---|---|---|---|---|---|
| 1 | 1.071 | 1.22 | 3 | 4 | 92 | 10 |
| 2 | 1.069 | 1.14 | 2 | 3 | 90 | 8 |
| 3 | 1.069 | 1.14 | 2 | 4 | 89 | 8 |
| 4 | 1.073 | 1.10 | 1 | 4 | 83 | 8 |
| 5 | 1.073 | 1.10 | 1 | 3 | 93 | 5 |
| 6 | 1.073 | 1.10 | 1 | 4 | 89 | 7 |
| Commercial Polyester |  |  | 1 | 18 | 37 | 7 |

The polyesters of the present invention are seen to excel in gloss retention and color on overbake when compared with the commercial polyester which is typical of the dimer acid containing polyesters for coil coating of the prior art.

What is claimed is:

1. A modified, normally crystalline, linear polyester of at least one phenylene dicarboxylic acid, a symmetrical $C_2$–$C_6$ alpha-omega dihydric alcohol, a flexibilizing aliphatic $C_4$–$C_{13}$ dicarboxylic acid, an aliphatic polyol containing at least three hydroxyl groups, and optionally, a monocarboxylic acid containing from two to 14 carbon atoms, the amount of phenylene dicarboxylic acid being in the range of from 35 to 60 percent by weight of the polyester forming ingredients charged, which polyester has an average hydroxyl functionality of from 1.9 to 2.6 free hydroxyl groups per molecule and a molecular weight of from 900 to 4,000 and in which the ratio (R) of equivalents of hydroxyl to the equivalents of carboxyl is in the range of from 1.08 to 1.24 prior to modification and the acid value is not in excess of 15, the ratio of the total equivalents of difunctional reactants to the total equivalents of reactants having a functionality of at least 3 being greater than 5 prior to modification, said polyester having a K value within the limits $K \geq 1.005 + 0.046R$ and $K \leq 1.060 + 0.046R$, said polyester being modified and rendered non crystalline by reaction with an alkylated alkylol melamine or an alkylated alkylol benzoguanamine at a temperature of from 150° to 450°F. for a period of from 20 minutes to 5 hours the amount of alkylated alkylol melamine or alkylated alkylol benzoguanamine being from 50 to 150 parts by weight per hydroxyl equivalent of polyester.

2. A modified linear polyester in accordance with claim 1 wherein the phenylene dicarboxylic acid is iso-phthalic.

3. A modified linear polyester in accordance with claim 1 wherein the phenylene dicarboxylic acid component is iso-phthalic acid and the aliphatic dicarboxylic acid is adipic acid.

4. A modified linear polyester in accordance with claim 1 wherein the dihydric alcohol is neopentyl glycol.

5. A modified linear polyester in accordance with claim 1 wherein the alkylated melamine is hexakis (methoxymethyl) melamine.

6. A modified linear polyester in accordance with claim 1 wherein the alkylated alkylol melamine is tetrakis (methoxymethyl) benzoguanamine.

7. A modified linear polyester in accordance with claim 1 wherein a monobasic acid is included and is monoisobutyl phthalate.

8. A modified linear polyester in accordance with claim 1 wherein a monobasic acid is included and is benzoic acid.

9. A modified linear polyester in accordance with claim 1 wherin the phenylene dicarboxylic acid is iso-phthalic acid, the aliphatic dicarboxylic acid is adipic acid; the dihydric alcohol is neopentyl glycol; and the alkylated alkylol melamine is hexakis (methoxymethyl) melamine.

* * * * *